United States Patent [19]

Mallett

[11] Patent Number: 4,655,497
[45] Date of Patent: Apr. 7, 1987

[54] FAIRING FOR BICYCLES AND THE LIKE

[76] Inventor: Gordon L. Mallett, 14985 - 157th Ave., Big Rapids, Mich. 49307

[21] Appl. No.: 676,865

[22] Filed: Nov. 30, 1984

[51] Int. Cl.$^4$ ............................................. B62K 19/48
[52] U.S. Cl. ................................ 296/78.1; 280/289 S
[58] Field of Search ................... 296/78.1, 78 R, 84 A; 280/289 S, 289 H; 135/88; 24/115 H

[56] References Cited

U.S. PATENT DOCUMENTS

| | | | |
|---|---|---|---|
| 557,488 | 3/1896 | Cherry | 296/78.1 |
| 597,298 | 1/1898 | Ross | 296/78.1 |
| 695,960 | 3/1902 | Stevens | 296/78.1 |
| 1,188,105 | 6/1916 | Schlegel | 296/78.1 |
| 1,239,916 | 9/1917 | Jose | 296/78.1 |
| 1,729,086 | 9/1929 | Premont | 296/78.1 |
| 2,974,329 | 3/1961 | Welch | 296/78 R |
| 3,266,464 | 7/1966 | Davis | 24/115 H |
| 3,891,265 | 6/1975 | Blackburn | 296/78.1 |
| 4,082,345 | 4/1978 | Willey | 296/78.1 |
| 4,166,650 | 9/1979 | Saunders, IV | 296/78.1 |
| 4,320,906 | 3/1982 | Saunders, IV | 296/78.1 |
| 4,353,590 | 10/1982 | Wei-Chuan | 296/78.1 |

FOREIGN PATENT DOCUMENTS

| | | | |
|---|---|---|---|
| 0867497 | 11/1941 | France | 296/78.1 |
| 0926762 | 10/1947 | France | 135/88 |

Primary Examiner—Robert B. Reeves
Assistant Examiner—Carol L. Olson
Attorney, Agent, or Firm—Price, Heneveld, Cooper, DeWitt & Litton

[57] ABSTRACT

A bicycle fairing for attachment to the handlebar and front wheel of a bicycle is disclosed. The fairing is constructed of a lower portion having a sheet-over-frame construction and an upper portion having a window therein. The window is comprised of a flexible, resilient pane which is unframed to provide the bicyclist with an unobstructed line of vision. The pane portion of the fairing is secured to the handlebar by a flexible line which prevents the pane from vibrating. The fairing is generally semicircular in cross section and is of such a length that it shields the rider's entire body, from his head to his feet, when is in a crouched position on the seat, from wind, rain projectiles and the like. The fairing is positioned on the bicycle so that the center point of the semicircular fairing is concentric with the vertical steering axis of the bicycle and so that the medial edges of the fairing extend along the sides of the handlebar. This positioning of the fairing alleviates the stability problems caused by the buffeting of the fairing by crosswinds and headwinds.

19 Claims, 5 Drawing Figures

FAIRING FOR BICYCLES AND THE LIKE

BACKGROUND OF THE INVENTION

The present invention relates to bicycle accessories, and in particular to a bicycle fairing for protecting a bicyclist from wind, rain and projectiles such as stones, insects and the like and for increasing pedalling efficiency.

Today, millions of people are riding bicycles, either as a sport or hobby, or as a primary mode of transportation. Bicyclists are, however, subject to vagaries of the weather because conventional bicycles do not provide protection against wind, rain and cold. In rainy weather, the bicyclist becomes wet and dirty from the rain itself and from water on the road splashing against him. In cold weather, the rider becomes chilled by headwinds impinging upon his body. The bicyclist is usually quite uncomfortable while he is riding in such adverse weather conditions.

Further, in windy weather, not only is the bicyclist's comfort decreased, but his efficiency in pedalling the bicycle is also decreased, especially if he is riding into a head wind. It is difficult and tiring for a bicyclist to ride into a head wind because of the drag effects of the wind acting on his body and on his bicycle. As a result, a bicyclist must work much harder when he pedals into a stiff head wind than when he pedals on a calm day or into only a slight head wind. Crosswinds also create problems for the bicyclist. Steady crosswinds, such as natural prevailing currents, must be continuously resisted by the bicyclist, and intermitent crosswinds, such as those created by automobile traffic on a busy road, which can be quite severe, must be compensated for quickly to maintain balance on the bicycle.

Fairings for bicycles have been designed and marketed in an attempt to alleviate the problems associated with cycling in adverse weather conditions. Heretofore, prior art fairings, typified by U.S. Pat. No. 3,891,265 to Blackburn, entitled FAIRING FOR ATTACHMENT TO THE HANDLEBARS OF A BICYCLE, and U.S. Pat. No. 695,960 to Stevens, entitled WINDSHIELD FOR CYCLES, protected only a portion of the bicyclist's body, such as only his head and neck, or only his legs and torso, thus leaving the other portions of his body unprotected. Further, with many of the prior art fairings, crosswinds acting on the fairing cause torques to be applied to the handlebar. These torques are undesirable because they must be resisted quickly by the rider and can cause unexpected movements of the handlebar which may spill the bicycle, potentially harming the bicyclist, the bicycle, or both.

Therefore, a need exists for a bicycle fairing which protects all portions of a bicyclist's body, yet does not detrimentally affect the stability and handling of the bicycle, or obstruct the bicyclist's line of vision. Further, a need exists for a fairing which is lightweight so as not to appreciably add to the weight of the bicycle and which is easy to install and remove as conditions warrant.

SUMMARY OF THE INVENTION

The present invention provides a fairing for bicycles which protects substantially all portions of the bicyclist's body, from his head to his feet, yet which is lightweight and easy to install. Further, the fairing is very safe to use, because it does not obstruct the cyclist's line of sight, and because it does not cause undesirable torques on the bicycle handlebar upon being buffeted by crosswinds. The fairing includes a lower portion having a lightweight frame over which a fabric sheet is stretched, and an upper portion comprised of a transparent pane. The fairing is positioned in front of the bicycle handlebar and front wheel, and is secured thereto, so that the fairing rotates with the handlebar and front wheel when the bicycle is steered.

In one aspect of the invention, the fairing is generally semi-circular in top plan configuration with a geometric centerpoint. When the fairing is secured to the bicycle, the geometric centerpoint of the fairing is concentric with the vertical steering axis of the bicycle, and the fairing's sides extend along the sides of the handlebar. The semicircular shape of the fairing and the positioning of the fairing on the bicycle greatly alleviates the imposition of undesirable torques on the handlebar when the fairing is buffeted by crosswinds. As a result, the fairing does not adversely affect the bicycle's stability or handling.

In another aspect of the invention, the fairing is of such a length that, when it is secured to the bicycle, the upper edge of the fairing is substantially level with the top of the bicyclist's head when he is riding in a crouched position, and the lower edge of the fairing is level with the lowermost extension of the bicycle pedals. The bicyclist's entire body, from his head to his feet, is thus protected from wind, rain and cold. As a result, the cyclist is much more comfortable when he rides in adverse weather conditions. Also, increased pedalling efficiency is achieved.

In yet another aspect of the invention, an improved windshield construction provides a transparent pane which is flexible and is unframed. An adjustable, flexible cord is positioned between the bicycle and the transparent pane to stabilize the windshield. The fairing with its unframed pane thus protects the cyclist's face from wind, rain and projectiles such as stones or insects, yet provides him with an unobstructed line of vision, straight ahead and to the left and to the right.

These and many other important advantages of the invention will be further understood and appreciated by those skilled in the art by reference to the following written specification, claims and appended drawings.

BRIEF DESCRIPTION OF THE DRAWINGSD

DETAILED DESCRIPTION OF THE PREFERRED EMBODIMENTS

Figure 1:
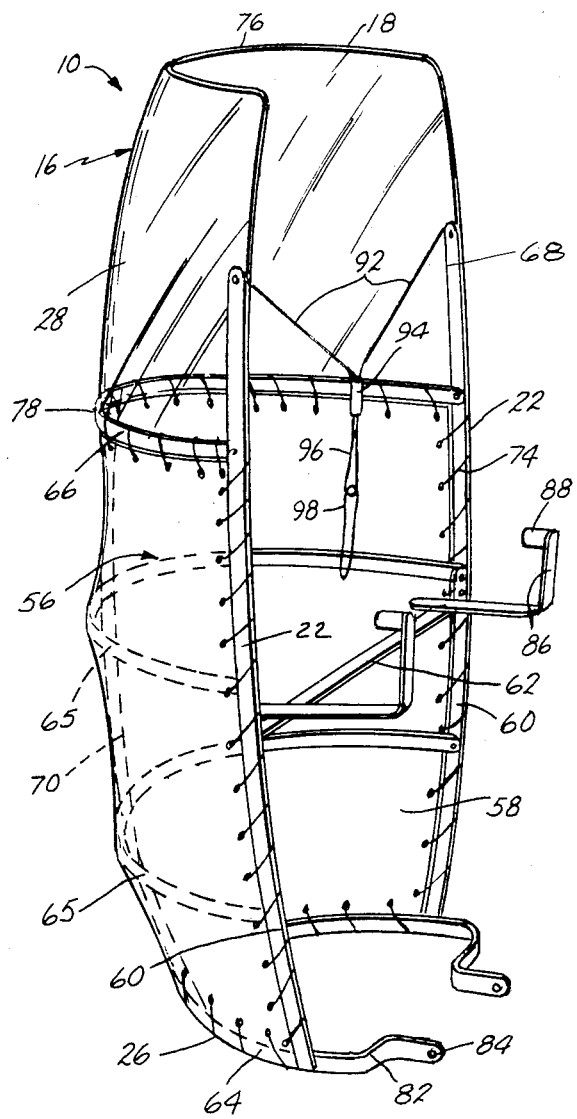
FIG. 1 is a side, perspective view of a fairing embodying the present invention.
Figure 2:
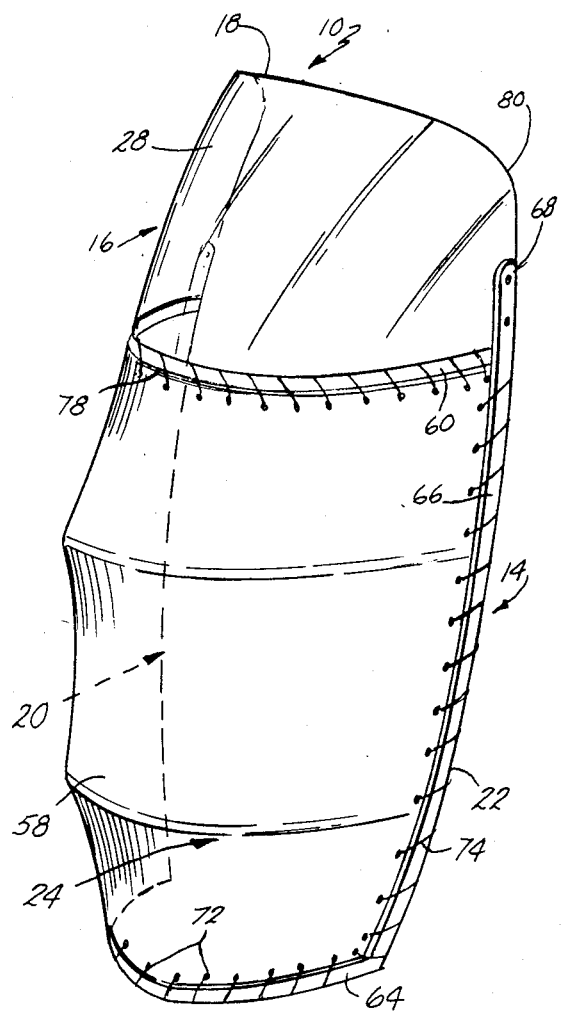
FIG. 2 is a frontal, perspective view of the fairing.
Figure 4:
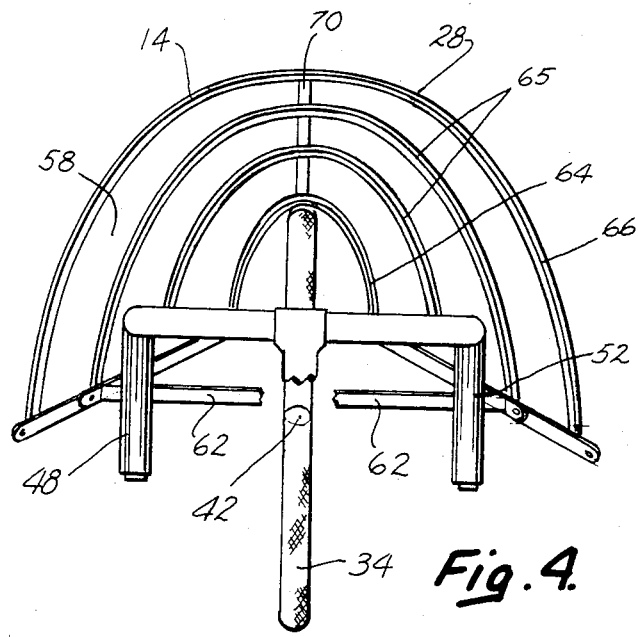
FIG. 4 is a top elevational view of the fairing shown attached to the bicycle, taken along a plane perpendicular to the steering axis of the bicycle.

For purposes of description herein, the terms "upper," "lower," "right," "left," "rear," "front," "vertical," "horizontal," and derivatives thereof shall relate to the invention as oriented in FIGS. 2 and 4. However, it is to be understood that the invention may assume various alternative orientations, except where expressly specified to the contrary.

Figure 3:
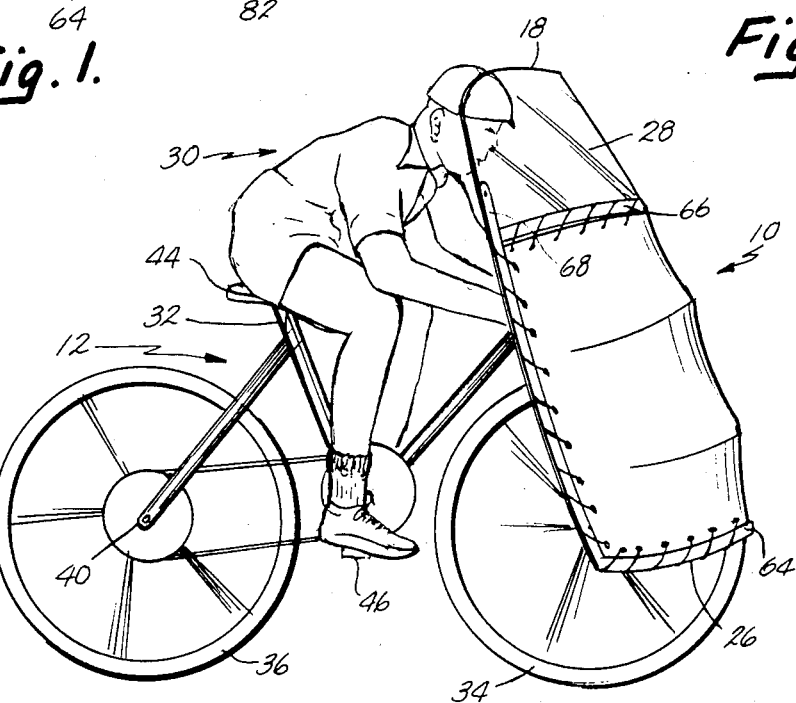
FIG. 3 is a side view of the fairing showing the fairing attached to a bicycle.

Referring now to the drawings, and more particularly, to FIG. 3 thereof, a fairing 10 of the present invention is shown in perspective view installed on a bicycle 12. Fairing 10 is comprised of a substantially imperforate, generally semi-circular shaped outer shell 14 and a mechanism for connecting the outer shell to bicycle 12. Shell 14 includes an upper portion 16 extending upwardly to an upper edge 18, a medial portion 20 extending outwardly to opposite medial edges 22, and a lower portion 24 extending downwardly to a lower edge 26. Upper portion 16 has a window or transparent pane 28 positioned therein to provide a cyclist 30 with an unobstructed line of vision.

Figure 5:
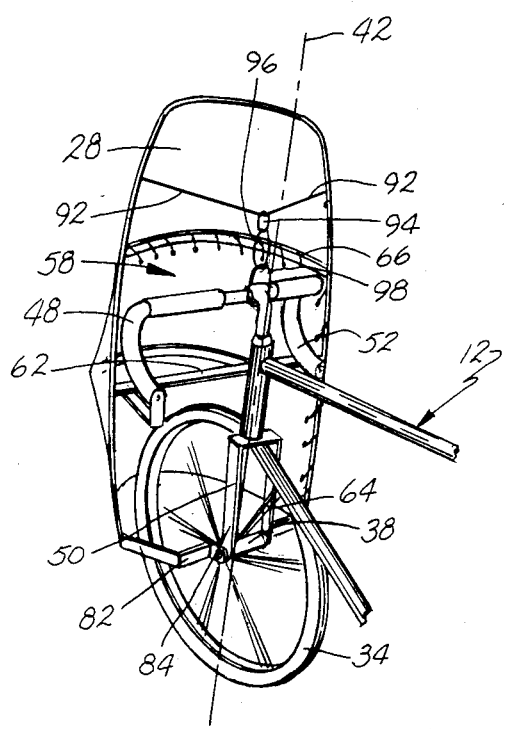
FIG. 5 is a rear perspective view of the fairing shown attached to the bicycle.

Fairing 10 is particularly adapted for use with conventional, multi-speed bicycles or other similar type vehicles. As shown in FIG. 3, bicycle 12 includes a frame 32 having front and rear wheel 34, 36 attached thereto by front axle 38 (shown in FIG. 5) and rear axles 40, respectively. Front wheel 34 is pivotal about a generally vertical steering axis 42, as shown by the dotted line in FIG. 5. Bicycle 12 further includes a seat 44 (FIG. 3) for supporting cyclist 30, pedals 46 for propelling the bicycle forward, and a handlebar 48 (FIG. 5) in communication with front wheel 34 via forks 50 for steering the bicycle. Handlebar 48 may be either of the dropped, curved-type, known in the industry as rams horn or racing handlebars, or of the standard type (not shown). A grip 52 may be secured to each of the ends of the handlebar to provide a location for the cyclist to position his hands.

Shell 14 includes a lower portion 24 which is comprised of a frame 56 over which is stretched and secured a fabric sheet 58. Frame 56 includes a pair of spaced apart medial members 60 connected together by a laterally extending brace 62 which has a length at least as great as the width of handlebar 48. Medial members 60 are also connected together by several generally semi-circular, C-shaped ribs 64, 65, 66. Lowermost rib 64 connects the lower ends of medial members 60 and defines lower edge 26 of shell 14. Uppermost rib 66 connects the upper ends of medial members 60 and preferably is positioned slightly below the upper ends of those medial members. Free portions 68, those portions of the medial members which extend above upper rib 66, are used to support pane 28, as discussed below. Lower portion 24, due to the construction of frame 56, is thus generally semicircular in top plan configuration. A vertical brace 70 connects the midpoints of each of the ribs to support and maintain those ribs in the proper orientation.

A fabric sheet 58 is stretched over frame 56 and secured thereto. The sheet is preferably comprised of a strong, lightweight material such as rip-stop nylon. The areas of the sheet adjacent the edges thereof have a plurality of small spaced-apart holes 72 extending therethrough. The sheet is secured to the frame by threading a flexible cord 74 through one of the holes 72, wrapping that cord around a portion of the frame, then inserting it through the next adjacent hole, then wrapping it around a portion of the frame. This alternating process of threading and wrapping is continued around the perimeter of the fabric sheet until the sheet is firmly secured to the frame. It should be understood, however, that the sheet could also be attached to the frame by means of snaps, rivets or other like-type fasteners.

Attached to the lower portion 24 of shell 14, and extending upwardly therefrom, is a windshield or pane 28. Pane 28 has an upper edge 76, a lower edge 78 and a pair of side edges 80 and is preferably generally semi-circular in top plan configuration. The pane is preferably comprised of a transparent, lightweight, elastically deformable material such as LEXAN, which in the trademark for a polycarbonate type thermoplastic polymer manufactured and sold by the Polymers Product Division of the General Electric Company. A thin, flexible sheet of material is used because the use of a rigid material, which would need to be fairly thick, would substantially increase the weight and the cost of the fairing.

Pane 28 is attached to the upper end of lower portion 24, preferably by affixing lower edge 78 to uppermost rib 66 and side edges 80 to upwardly extending portions 68 of medial member 60. Preferably, free portions 68 extend along approximately only the lower portions of side edges 80, the upper portions of those side edges remaining free and unframed. Upper edge 76 of pane 28 is also free and unsupported to define the upper edge 18 of shell 14. Because the top edge and the upper portions of the side edges are free, i.e., unframed, the pane does not obstruct the cyclist's line of vision when he is in a crouched position on seat 44. This is an important safety feature of the present invention, for it provides the cyclist with a clear line of vision straight ahead and to the left and to the right.

As will be discussed below, a flexible line 92 connects the pane to the bicycle. The tension on the flexible, resilient pane is adjusted by adjusting the tension in line 92. This prevents the pane from vibrating upon being buffeted by head or crosswinds.

The combination of the sheet-over-frame construction of the lower portion and the lightweight pane of the upper portion yields a shell having a generally semi-circular top plan configuration. Further, this construction provides an extremely lightweight yet durable shell which, when installed on bicycle 12, does not appreciably add to the weight of that bicycle.

Fairing 10 further includes an arrangement for connecting shell 14 to bicycle 12. A first connector comprises a pair of brackets 82 attached to the lower ends of medial members 60. The brackets extend outwardly therefrom, in a direction opposite the direction which ribs 64, 65, 66 extend. The free ends of brackets 82 have holes 84 for attaching those brackets to front axle 38 to positively locate shell 14 in front of front wheel 34 (See FIG. 5).

A second connector comprises a pair of L-shaped brackets 86 attached to lateral brace 62 and extending outwardly therefrom, in the same direction as which brackets 82 extend. The L-shaped brackets include a resilient, cylindrically-shaped clamp 88 attached to the free ends thereof which are telescopingly received into the ends of the handlebars 48 (See FIG. 5). After the clamps are inserted into the handlebar, a longitudinally extending screw is manipulated to force the resilient clamp 88 radially outwardly against the interior surface of handlebars 48. L-shaped brackets 82 securely lock shell 14 into position in front of the handlebars.

A third connector comprises a first flexible line 92, the free ends of which are inserted through a cylindrical member 94 and then attached to side edges 80 of pane 28. Preferably, the ends of flexible cord 92 are secured to upper portion 68, those portions of medial members 60 which extend above the uppermost rib to support the side edges of the pane (See FIG. 5). A noose portion 96 is formed below cylindrical member 94. A second flexible cord 98 is inserted through noose portion 96 and then tied off around a portion of the bicycle, preferably to handlebar 48. The tension in first flexible cord 92 can be controlled by sliding the cylindrical member along the strands of that cord. In this way, the flexible pane 28 can be stabilized so that it does not vibrate excessively when it is buffeted by either head winds or crosswinds.

In use, fairing 10 can be quickly and easily installed on bicycle 12 by attaching brackets 82 to front axle 38, by inserting clamps 88 of L-shaped bracket 86 into the ends of handlebar 48, and by securing the second flexible cord 98 to handlebar 48. The above arrangement for connecting the fairing to the bicycle locates the fairing in front of the handlebar and front wheel. As seen in FIG. 4, the front portion of front wheel 34 extends into the semi-circle defined by shell 14. This connection permits the fairing to rotate with the handlebar and front wheel as the bicycle is steered.

The above connecting arrangements also locate the geometric centerpoint of shell 14 in a generally concentric relationship with vertical steering axis 42 of the bicycle. In this position, medial edges 22 of the shell extend along the sides of handlebar 48. This positioning of the fairing substantially prevents the formation of undesirable torques in the handlebar when the shell is buffeted by cross or head winds. For example, because the fairing extends along the sides of the handlebar, any crosswind will be deflected away by the curved exterior fairing surface. The crosswinds thus do not flow along the length of the handlebar to catch the inner surface of the opposite medial edge. Also, the curved exterior fairing surface does not present any pockets which may collect air when riding into a headwind. Rather, air "slides" along the surface, then flows outwardly past the medial edges. As a result, the fairing does not substantially adversely affect the stability and handling of the bicycle.

The fairing is of such a length that, when it is attached to the bicycle, it extends from a level substantially commensurate with the top of the bicyclist's head when the cyclist is in a crouched, racing position on the seat, to a level substantially commensurate with the lowermost extension of pedals 46 (See FIG. 3). The fairing thus shields the bicyclist's entire body, from his head and face, down to his torso and legs, from wind, rain and projectiles such as stones or insects. This full shielding substantially increases the cyclist's comfort when he bicycles in adverse weather conditions. It has been found for example, that a cyclist, when wearing short pants and a light shirt, can ride comfortably in 55 degree fahrenheit weather. The full shielding effect also increases the cyclist's efficiency in pedalling his bicycle into a head wind by diverting air around the bulk of the his body. It has been found that a cyclist pedalling a bicycle with the fairing of the present invention attached thereto expends less effort to attain a given speed than a cyclist pedalling a bicycle without such a fairing attached thereto.

In the foregoing description, it will be readily appreciated by those skilled in the art that many modifications may be made to the invention without departing from the concepts disclosed herein. Such modifications are to be considered as included in the following claims unless these claims by their language expressly state otherwise.

The embodiments of the present invention in which an exclusive property or privilege is claimed are defined as follows.

1. A fairing for bicycles and the like of the type having a front wheel pivotal about a generally vertical axis, and a handlebar connected with the front wheel for steering the bicycle, said fairing comprising:
   (a) a substantially imperforate outer shell, positioned forward of the bicycle handlebar, and extending upwardly and downwardly therefrom to shield a rider on the bicycle against wind, rain and the like; said outer shell having a generally semi-circular plan shape, with a geometrical center point; and
   (b) means for connecting said fairing with one of the front wheel and the handlebar of the bicycle for rotation therewith as the bicycle is steered; said connecting means retaining said fairing in front of the bicycle, and locating the center point of said outer shell in a generally concentric relationship with the vertical steering axis of the bicycle, thereby substantially alleviating the imposition of undesirable, externally imposed torques on the bicycle handlebar from the force of cross winds and the like acting on said fairing.

2. A fairing as recited in claim 1, comprising:
   an upper portion of said outer shell extending over the handlebar to an upper edge, a medial portion of said outer shell extending outwardly adjacent the handlebar to opposite side edges, and a lower portion of said outer shell extending downwardly from the handlebar to a lower edge; a window positioned in the upper portion of said outer shell to provide the rider with a line of vision when he is in a crouched position on a seat portion of the bicycle; and wherein said upper edge of said shell is positioned at a level substantially commensurate with the top of the rider's head when the rider is in a crouched position on the seat, said opposite side edges thereof are positioned substantially commensurate with the ends of the handlebar, and said lower edge thereof is positioned substantially commensurate with the lowermost extension of pedals on the bicycle, whereby said outer shell forms a continuously extending shield at least partially around the head, hands, torso and legs of a rider when he is seated in a crouched position, to direct wind, rain, and the like around the rider for improved riding comfort, and to reduce wind resistance for improved pedalling efficiency.

3. A fairing for bicycles as recited in claim 2, wherein said lower portion of said shell comprises:
   a rigid frame having spaced apart lateral members connected together at various points along their length by spaced apart, generally semicircular ribs; and
   a fabric sheet stretched over said frame to provide a sheet-over-frame construction which is extremely lightweight and affords good protection to the rider shielded thereby.

4. A fairing as recited in claim 3 wherein said window comprises:
   a transparent, elastically deformable pane having a lower edge attached to said lower portion of said shell, and free, unsupported top and side edges; said free top edge defining the upper edge of the upper portion of said shell, and said free side edges defining the opposite side edges of said upper portion of said shell, whereby said free top and side edges provide the seated rider with an unbroken, unobstructed line of vision straight ahead and to the left and to the right; and means for stabilizing said free, elastically deformable pane when said shell is positioned on the bicycle.

5. A fairing as recited in claim 4 wherein said means for stabilizing said pane comprises a flexible line connected with said pane, adjacent upper corners thereof, and with the bicycle.

6. A fairing as recited in claim 5 wherein the ends of said flexible line are connected to opposite side edges of said pane; said means for stabilizing said pane further comprising a cylinder through which each of the ends of said flexible line are passed before said ends are attached to said opposite side edges, said cylinder being slidable along said flexible line to form an adjustable noose therebelow; and a cord which is inserted through said adjustable noose and then tied around said handlebars to form a second noose; whereby the tension on said pane is adjusted by sliding said cylinder along said flexible line.

7. A fairing as recited in claim 2 wherein said window comprises:
a transparent, elastically deformable pane having a lower edge attached to said lower portion of said shell, and free, unsupported top and side edges; said free top edge defining the upper edge of the upper portion of said shell, and said free side edges defining the opposite side edges of said upper portion of said shell, whereby said free top and side edges provide the seated rider with an unbroken, unobstructed line of vision straight ahead and to the left and to the right; and
means for stabilizing said free, elastically deformable pane when said shell is positioned on the bicycle.

8. A fairing as recited in claim 7 wherein said means for stabilizing said pane comprises a flexible line connected with said pane, adjacent upper corners thereof, and with the bicycle.

9. A fairing as recited in claim 8 wherein the ends of said flexible line are connected to opposite side edges of said pane; said means for stabilizing said pane further comprising a cylinder through which each of the ends of said flexible line are passed before said ends are attached to said opposite side edges, said cylinder being slidable along said flexible line to form an adjustable noose therebelow; and a cord which is first inserted through said adjustable noose and then tied around said handlebars to form a second noose; whereby the tension on said pane is adjusted by sliding said cylinder along said flexible line.

10. A fairing for bicycles as recited in claim 1 wherein said outer shell comprises:
a frame having spaced apart lateral members connected together at various points along their length by spaced apart, generally semicircular ribs; and
a fabric sheet stretched over said frame to provide a sheet-over-frame construction which is extremely lightweight and affords good protection to the rider shielded thereby.

11. A fairing for bicycles and the like of the type having a seat for supporting a rider, pedals for propelling the bicycle, and a front wheel with a handlebar for steering the bicycle, said fairing comprising:
(a) a substantially imperforate outer shell having an upper portion thereof extending over the handlebar to an upper edge, a medial portion extending outwardly adjacent the handlebar to opposite side edges, and a lower portion thereof extending downwardly from the handlebar, in front of and over the front wheel of the bicycle, to a lower edge;
(b) a window positioned in the upper portion of said shell to facilitate steering the bicycle when the rider is in a crouched position on the bicycle seat;
(c) means for positioning said shell in front of the bicycle and for connecting the same with the front wheel of the bicycle and the handlebar so that said outer shell rotates with the handlebar and front wheel as the bicycle is steered; and wherein
(d) said shell has the upper edge thereof positioned at a level substantially commensurate with the top of the head of the rider when the rider is in the crouched position on the seat, the opposite side edges thereof positioned substantially commensurate with grip portions of the handlebar, and the lower edge thereof positioned at a level substantially commensurate with a lowermost extension of the bicycle pedals, whereby said outer shell forms a continuously extending shield at least partially around the head, hands, torso, and legs of a rider when he is seated in the crouched position, to direct wind, rain, and the like around the rider for improved riding comfort, and to reduce wind resistance for improved pedaling efficiency, and wherein
(e) said ribs and said upper portion of said shell are generally semi-circular in shape, said outer shell thereby having a generally semi-circular plan shape with a geometric center point.

12. A fairing for bicycles as recited in claim 11 wherein the bicycle front wheel is pivotal about a vertical axis and wherein said means for positioning said shell in front of the bicycle and for connecting the same thereto locates the center point of said shell in a generally concentric relationship with the vertical axis of the bicycle to substantially alleviate the imposition of externally imposed torques on the bicycle handlebar from the force of cross winds and the like acting on the bicycle.

13. A fairing as recited in claim 12 wherein said window comprises:
a transparent, elastically deformable pane; said pane having a lower edge attached to said lower portion of said shell and free, unsupported top and side edges, said free top edge defining the upper edge of the upper portion of said shell and said free side edges defining the opposite side edges of said upper portion of said shell, whereby said free top and side edges provide the rider, when he is in a crouched position on the seat, with an unbroken, unobstructed line of vision straight ahead and to the left and to the right; and
means for stabilizing said free, elastically deformable pane when said shell is positioned on the bicycle.

14. A fairing as recited in claim 13 wherein said means for stabilizing said pane comprises a flexible line connected with said pane, adjacent upper corners thereof, and with the bicycle.

15. A fairing as recited in claim 14 wherein the ends of said flexible line are connected to opposite side edges of said pane; said means for stabilizing said pane further comprising a cylinder through which each of the ends of said flexible line are passed before said ends are attached to said opposite side edges, said cylinder being slidable along said flexible line to form an adjustable noose therebelow; and a cord which is inserted through said adjustable noose and then tied around said handlebars to form a second noose; whereby the tension on said pane is adjusted by sliding said cylinder along said flexible line.

16. A fairing as recited in claim 11 wherein said window comprises:
   a transparent, elastically deformable pane; said pane having a lower edge attached to said lower portion of said shell and free, unsupported top and side edges, said free top edge defining the upper edge of the upper portion of said shell and said free side edges defining the opposite side edges of said upper portion of said shell, whereby said free top and side edges provide the rider, when he is in a crouched position on the seat, with an unbroken, unobstructed line of vision straight ahead and to the left and to the right; and
   means for stabilizing said free, elastically deformable pane when said shell is positioned on the bicycle.

17. A fairing as recited in claim 16 wherein said means for stabilizing said pane comprises a flexible line connected with said pane, adjacent upper corners thereof, and with the bicycle.

18. A fairing as recited in claim 17 wherein the ends of said flexible line are connected to opposite side edges of said pane; said means for stabilizing said pane further comprising a cylinder through which each of the ends of said flexible line are passed before said ends are attached to said opposite side edges, said cylinder being slidable along said flexible line to form an adjustable noose therebelow; and a cord which is inserted through said adjustable noose and then tied around said handlebars to form a second noose; whereby the tension on said pane is adjusted by sliding said cylinder along said flexible line.

19. A fairing for bicycles as recited in claim 18 wherein said outer shell is generally semicircular in shape.

* * * * *